(12) United States Patent
Hahn

(10) Patent No.: US 8,606,983 B2
(45) Date of Patent: Dec. 10, 2013

(54) DEVICE AND METHOD FOR MANIPULATING COMMUNICATION MESSAGES

(75) Inventor: Siegfried Hahn, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 842 days.

(21) Appl. No.: 12/311,817

(22) PCT Filed: Nov. 2, 2007

(86) PCT No.: PCT/EP2007/061827
§ 371 (c)(1),
(2), (4) Date: May 12, 2010

(87) PCT Pub. No.: WO2008/053040
PCT Pub. Date: May 8, 2008

(65) Prior Publication Data
US 2010/0293311 A1    Nov. 18, 2010

(30) Foreign Application Priority Data

Nov. 3, 2006  (DE) .................. 10 2006 052 267
Oct. 1, 2007  (DE) .................. 10 2007 047 248

(51) Int. Cl.
*G06F 13/26*        (2006.01)
(52) U.S. Cl.
USPC ......................... 710/306; 370/241
(58) Field of Classification Search
USPC ............ 710/14, 117, 305, 306, 316; 370/241, 370/242, 244, 250, 252
See application file for complete search history.

(56) References Cited

U.S. PATENT DOCUMENTS

| | | | |
|---|---|---|---|
| 5,481,735 A * | 1/1996 | Mortensen et al. | 709/246 |
| 2005/0141565 A1* | 6/2005 | Forest et al. | 370/503 |
| 2008/0130638 A1* | 6/2008 | Weeks | 370/389 |
| 2009/0172216 A1* | 7/2009 | Luedeke et al. | 710/35 |
| 2009/0262649 A1* | 10/2009 | Zinke et al. | 370/242 |
| 2010/0241776 A1* | 9/2010 | Bayerl et al. | 710/260 |
| 2010/0254382 A1* | 10/2010 | Steffen et al. | 370/389 |

FOREIGN PATENT DOCUMENTS

GB        2 417 865        3/2006

OTHER PUBLICATIONS

Flexray Automobilt Communication Bus Overview, National Instruments, Aug. 21, 2009.*
FlexRay Automotive Communication Bus Overview, National Instruments, Aug. 21, 2009, 6 pages.

* cited by examiner

*Primary Examiner* — Khanh Dang
(74) *Attorney, Agent, or Firm* — Kenyon & Kenyon LLP

(57) ABSTRACT

A device for manipulating communication messages in a communication system is provided, which communication system includes a data bus, and a plurality of nodes connected thereto, and an arrangement for transmitting messages in message frames at fixedly predefined communication cycles. The device is connected in the data bus between at least one node for which the messages to be manipulated are intended and the other nodes of the communication system. The device has an arrangement for intercepting the messages before they reach the at least one node, an arrangement for manipulating the intercepted messages, and an arrangement for transmitting the manipulated messages to the at least one node.

11 Claims, 6 Drawing Sheets

DEVICE AND METHOD FOR MANIPULATING COMMUNICATION MESSAGES

BACKGROUND OF THE INVENTION

1. Field of the Invention

The present invention relates to a device and a method for manipulating communication messages in a communication system which includes a data bus, a plurality of nodes connected thereto, and means for transmitting messages in message frames at fixedly predefined communication cycles. The present invention also relates to a communication system which includes a data bus, a plurality of network nodes connected thereto, and means for transmitting communication messages between the nodes via the data bus in message frames at fixedly predefined communication cycles.

2. Description of Related Art

Interconnection of control units, sensors, and actuators with the aid of a communication system and a communication link, for example, in the form of a data bus, has drastically increased in the past few years in particular in the automotive industry, but also in other areas such as mechanical engineering, especially in the machine tool industry and in automation. By connecting a plurality of stations or nodes to a data bus in a communication system, synergy effects may be achieved by distributing functions to a plurality of nodes. These are known as distributed systems.

Communication among different stations of such a communication system takes place via a data bus. This communication traffic on the bus system, access mechanisms, and receiving mechanisms, as well as error processing, are regulated via a data transmission protocol or a communication protocol. A protocol known from the related art, which provides for transmission of messages in message frames at fixedly predefined communication cycles is, for example, the FlexRay protocol. FlexRay is a high-speed, deterministic and error-tolerant bus system, in particular for use in motor vehicles. The FlexRay protocol operates according to the time-division multiple-access (TDMA) principle, in which the stations or the messages to be transmitted are assigned fixed time slots in which they have exclusive access to the data bus. The time slots are repeated in a fixedly predefined communication cycle, so that the point in time at which a message is transmitted over the data bus may be accurately predicted, and bus access thus takes place deterministically.

In order to optimally utilize the bandwidth for message transmission on the data bus, FlexRay subdivides the communication cycle into a static and a dynamic part. The fixed time slots are located in the static part at the beginning of a communication cycle. In the dynamic part, the size of the time slots is dynamically predefined. Exclusive bus access in the time slot is enabled only for a short time, for the duration of at least one so-called minislot. Only if a bus access occurs within a minislot is the time slot extended for the time needed. The bandwidth is thus used only if it is actually needed for transmitting information. Despite the deterministic character of FlexRay, it also allows event-controlled message transmission via the dynamic portion of a communication cycle.

Two separate channels are provided in FlexRay for data transmission. FlexRay communicates via one or two physically separated lines per channel at a data rate of 10 Mbit/s maximum each. Of course, FlexRay may also be operated at lower data rates. The lines of the two channels correspond to the physical layer, in particular of the so-called OSI (Open System Architecture) layer model. It is possible to use both channels for redundant and therefore error-tolerant transmission of messages, the same data then being transmitted simultaneously over both channels. Alternatively, different messages may also be transmitted over the two channels, whereby the data rate could then be doubled in the FlexRay communication system. It is also conceivable that the signal transmitted via the connecting lines results from the difference of the signals transmitted over the two lines. Finally, only one channel may also be used for the data transmission, in which case the other channel is unused and free. At this time typical FlexRay applications are designed redundantly to have one channel or two channels. The physical layer is designed in such a way that it makes both electrical and optical transmission of the signal(s) via the line(s) or transmission in other ways possible.

In order to implement synchronous functions in the communication system and to optimize the bandwidth via the smallest possible intervals (idle times) between two messages, the nodes in the communication network need a common time base, the so-called global time. Synchronization messages are transmitted in the static part of the cycle for synchronizing local clocks of the nodes, the local times of the stations being corrected with the aid of a special algorithm according to the FlexRay specification in such a way that all local clocks run synchronously with a global clock.

A FlexRay station or FlexRay node contains a processor, a communication controller and, if bus monitoring is implemented, a so-called bus guardian. The processor delivers and processes the data which are received or transmitted via the communication controller. In addition, a FlexRay station includes a bus driver for access to the physical layer. For communication in a FlexRay network, messages may be configured to have up to 254 data bytes, for example.

At this time, in a deterministic communication system, it is not possible to manipulate, in an arbitrary manner, messages or payload data of the messages transmitted in the message frames for defined nodes of the communication system. Manipulating messages or the payload data contained therein may be advisable, for example, in connection with the design, layout, and a test operation of a communication system. By manipulating messages or the payload data contained therein, for certain nodes of a communication system it may be ascertained or checked how the node or the communication system responds to the manipulation and/or whether the node or the communication system responds as expected.

At this time, messages transmitted in a deterministic communication system are manipulated only at bit level. These manipulations are designed as stress tests for the communication system. In doing so, however, not the actual payload data, but only certain bits in the so-called header or in the so-called trailer of a message frame are modified. More extensive manipulation of transmitted messages or of payload data contained in the messages is not being practiced at this time and can currently not be implemented. Manipulation of the payload data in a message frame would be possible, at best, by modifying the hardware and/or the software of the nodes. By using such manipulation at the nodes for test purposes, however, the tested communication system would no longer correspond to the communication system actually used in practice (without modifications at the nodes), and the test results would not be relevant for the actual practical application of the communication system.

BRIEF SUMMARY OF THE INVENTION

An object of the present invention is to make manipulation of messages or of payload data contained therein possible in a rather simple way without modification of the hardware and/or the software being necessary at any node of the communication system.

To achieve this object, a device is proposed as part of the communication system which has a data bus and a plurality of nodes connected thereto. In the communication system, messages are transmitted in message frames at fixedly predefined communication cycles. The messages to be manipulated are intended for at least one node of the communication system. The device is connected in the data bus between the at least one node for which the messages to be manipulated are intended and the other nodes of the communication system. The device has means for intercepting the messages intended for the at least one node before they reach the at least one node, means for manipulating the intercepted messages, and means for transmitting the manipulated messages to the at least one node.

According to the present invention, not the original messages, but manipulated messages are transmitted in certain message frames in which messages are transmitted for at least one defined node of the communication system, which is to receive the manipulated messages. The messages are manipulated by a device situated in the data bus, which intercepts and manipulates the transmitted original messages before they reach the node for which they are intended, and subsequently relays the manipulated messages to the node for which the original messages were originally intended. In this way, manipulation of messages or the payload data contained therein is possible in a simple manner, without requiring modification of the hardware and/or the software at any of the nodes of the communication system. The device according to the present invention is simply installed in the data bus at the desired point for test purposes and is removed again from the data bus for regular operation. Otherwise no changes are made in the communication system. This is the prerequisite for the information acquired during the test operation of the communication system to be really transferable to the actually implemented communication system and relevant for its practical application.

During a channel idle time suitable switching elements of the device are preferably switched between the message frames in such a way that not the original message, but the manipulated message is transmitted to the test nodes in the following message frame. If the manipulated data assume absolute/constant values, there is no time limitation regarding the allocation to the time slots, i.e., the manipulated message may still be transmitted in the same time slot as the original message would have been. However, if signals that change over time are to be manipulated, the manipulated values must be calculated from the original values of the corresponding previous message, i.e., from the corresponding message of the previous time slot. This is because the current signal values are input by the device no sooner than in the time slot in which the manipulated signals are transmitted by the device to the test node(s). The manipulated messages may thus be received at the test node(s) only with a certain delay with respect to the actual original messages. The delay corresponds to the signal repeat rate (repeat rate of the messages), in particular to one or more communication cycles. This delay does not, however, affect regular operation of the communication system as long as the signal repeat rate is sufficiently high compared to the signal change rate of interest. For most mechanical systems, this means no limitation, since they have such an inertia that the repeat rate of the messages is usually sufficiently high compared to the signal change rate.

DETAILED DESCRIPTION OF THE INVENTION

Figure 1:
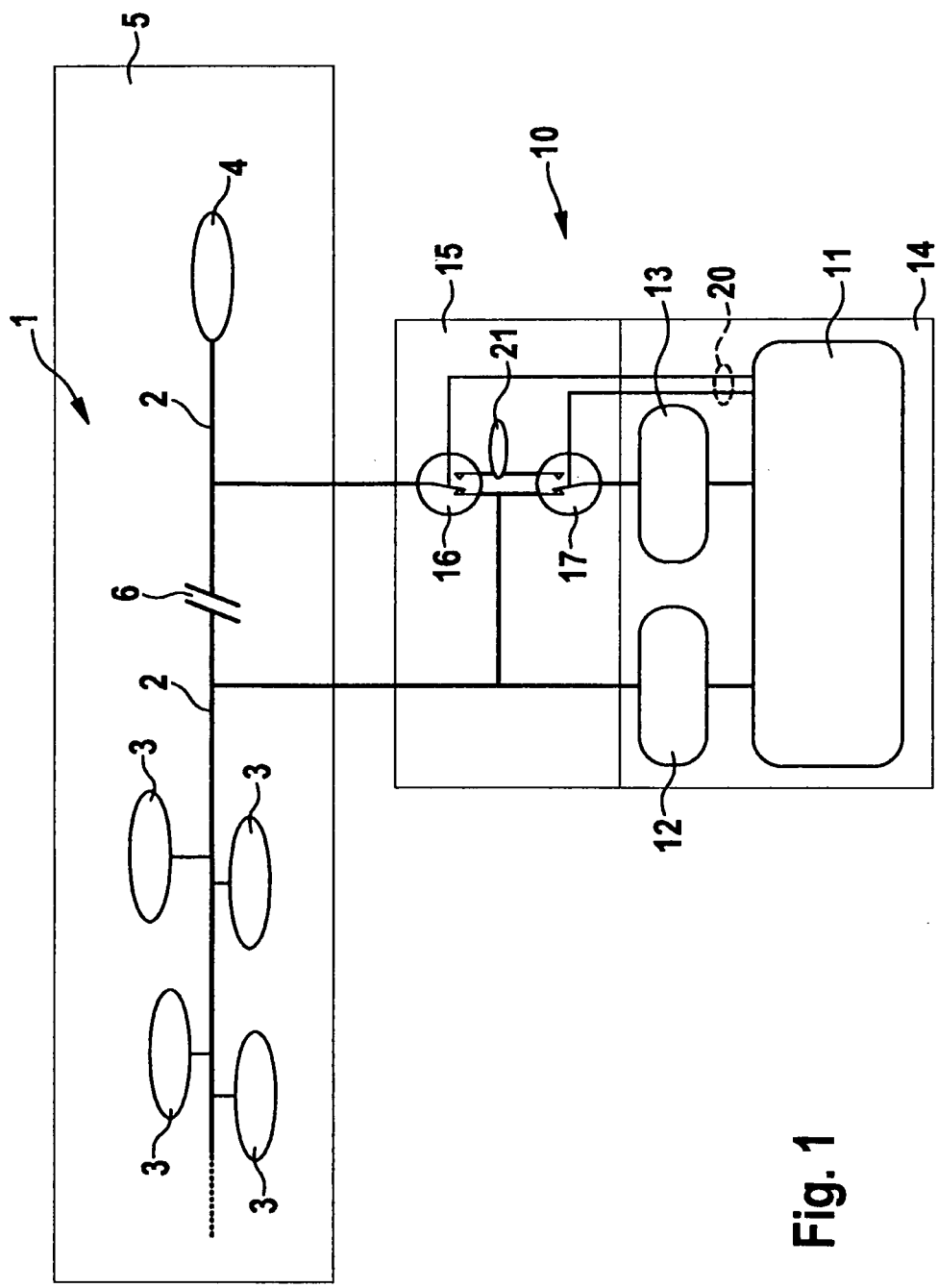
FIG. 1 shows a communication system according to the present invention having the device according to the present invention according to a first example embodiment.

In FIG. 1, a communication system according to the present invention which, in the present exemplary embodiment, is designed as a FlexRay communication system is labeled in its entirety with reference numeral 1. The present invention is elucidated below in greater detail with reference to a FlexRay communication system, which is to be considered limiting only to the extent that the features of the communication system are prerequisites for the present invention. If these prerequisites are also given in another communication system, the present invention is also applicable to such a communication system. The present invention is thus applicable in general to bus systems in communication technology, in particular in communication systems in which the information to be transmitted is transmitted deterministically (at predefined points in time) in message frames over the bus system.

Communication system 1 includes a data bus 2 and a plurality of communication stations 3, 4, also referred to as nodes, connected thereto. Data bus 2 includes two channels ChA, ChB, and two lines BP (bus plus) and BM (bus minus) for each of the channels. Data bus 2 and nodes 3, 4 are all situated in a motor vehicle 5 in the described exemplary embodiment. Of course, data bus 2 and nodes 3, 4 may also be situated in a tool system, for example, in a machine tool, or a system from automation technology. Stations 3, 4 are control units for controlling and/or regulating certain functions of motor vehicle 5. They may be control units for the engine or the transmission, for an antilock system, a traction control system or an electronic stability program, or a control unit for implementing any comfort function (seat adjustment, air conditioning of the passenger compartment, etc.) in the vehicle. Control units 3, 4 exchange information via FlexRay data bus 2. In FlexRay communication system 1, the information is transmitted in message frames at fixedly predefined communication cycles. The FlexRay protocol operates according to the time-division multiple-access (TDMA) principle, in which nodes 3, 4 or the messages to be transmitted are assigned fixed time slots in the message frames in which they have exclusive access to data bus 2. The time slots are repeated in an established cycle, which usually corresponds to the communication cycle. It is also conceivable that the repeat cycle of the time slots corresponds to two, three, or even more communication cycles. In the communication cycles in between, another message or the message of another node 3, 4 may be transmitted in the corresponding message frame. This is also referred to as a multiplex operation of communication system 1. The point in time at which a message is transmitted via data bus 2 may thus be accurately predicted; bus access therefore takes place deterministically.

Figure 2:
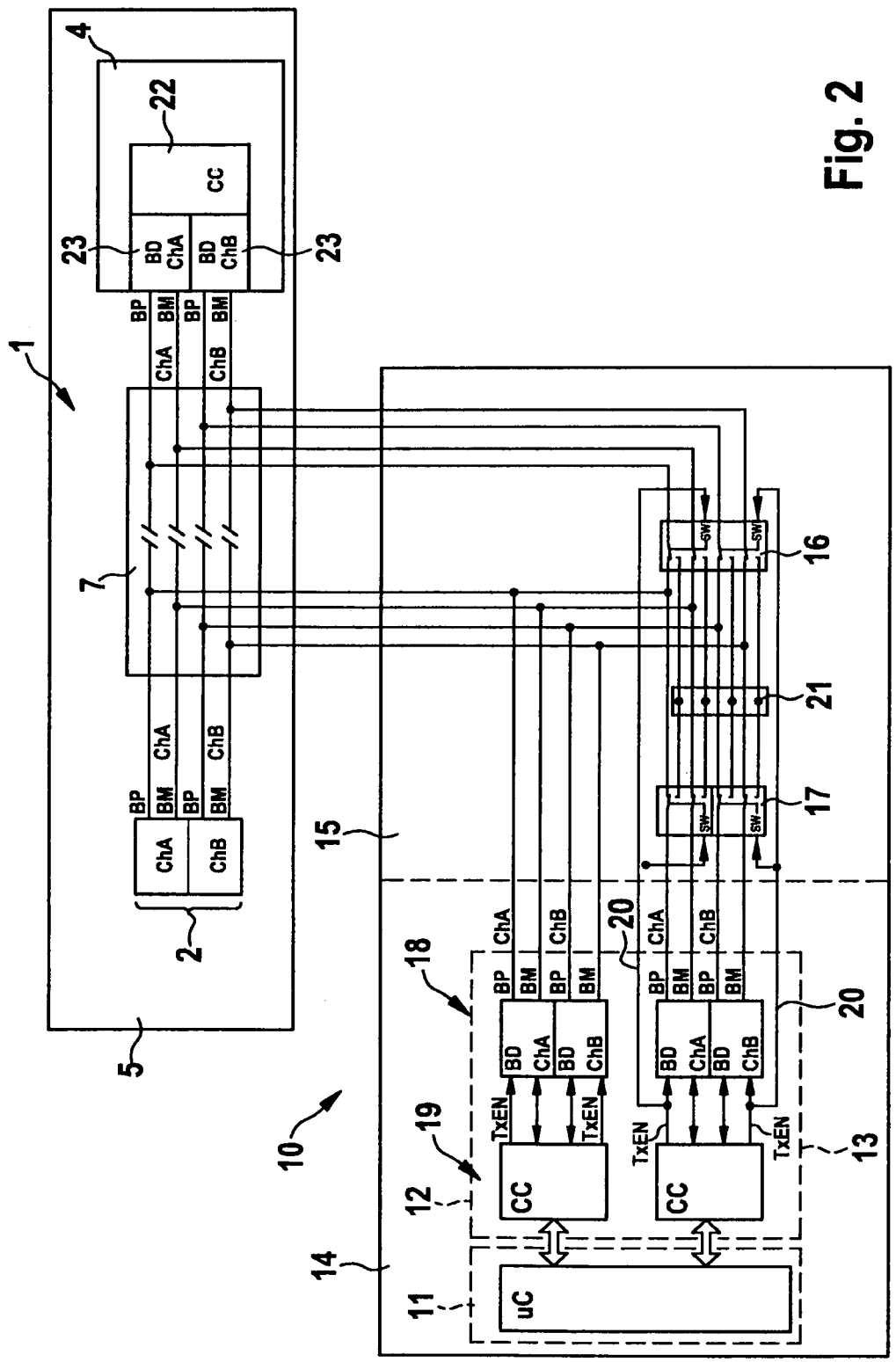
FIG. 2 shows a wiring diagram of the communication system of FIG. 1.

After designing and laying out a new communication system 1, it must be initially tested for reliability performance in different operating states. Messages manipulated in a targeted manner are supplied to some or all nodes 3, 4 consecutively either individually or in groups. The manipulation of messages includes any change, in particular of the payload data of the messages, for example, changes of status values, checksum values, offset values, offset ramps, sensitivity values, scaling values, etc. By manipulating messages or the payload data contained therein, different operating states of nodes 3, 4 of data bus 2, and/or of the entire communication system 1 may be simulated for test purposes. In the present exemplary embodiment, nodes 3 are being operated normally, and only node 4 is being tested. Node 4 is therefore also referred to as Device Under Test (DUT). The details of DUT 4 are illustrated in FIG. 2, according to which DUT 4 includes a communication controller (CC) 22 and a bus driver (BD) 23 for each channel ChA, ChB of data bus 2.

To be able to supply manipulated messages to node 4 to be tested in a simple manner, in particular without a modification and/or extension of the hardware and/or the software of node 4 or of other nodes 3 of communication system 1 being needed, according to the present invention, the use of a separate device is proposed, which is labeled with reference numeral 10 in its entirety in FIG. 1. Device 10 is installed in data bus 2 at a point 6, where data bus 2 has been interrupted, in such a way that it separates normally operated nodes 3 from node 4 to be tested. To divide data bus 2 between FlexRay cluster 4 to be manipulated (includes one or more nodes to be tested) and the remaining FlexRay bus 2, 3, an intermediate box or switch-off box 7 may be used, for example. Manipulation device 10 may also be connected to interrupted data bus 2 via this box 7.

A device which offers a FlexRay/FlexRay gateway function and is programmable may be used as a basis for device 10. For this purpose, device 10 has a programmable gateway 14. Gateway 14 has a gateway controller 11 and two separate nodes 12, 13, in the present exemplary embodiment two separate FlexRay nodes. Gateway controller 11 is connected to data bus 2 on both sides of isolating point 6 via the two FlexRay interfaces 12, 13. Nodes 12, 13 of device 10 may be software operated via a processor or via a plurality of processors communicating with each other. Gateway functions may also be implemented with the aid of a personal computer (PC) or a so-called embedded controller, which has suitable interfaces to communication system 1, so that at least two independent nodes of communication system 1 are available.

Furthermore, manipulation device 10 according to the present invention has additional hardware 15, which in the present exemplary embodiment includes two high-speed analog multiplexers per FlexRay line BP, BM. The wiring of analog multiplexers 16, 17 may be seen in particular in FIG. 2, where both the two channels ChA, ChB and the two lines BP, BM per channel of communication system 1 are illustrated. Multiplexers 16, 17 must be sufficiently fast for being able to switch over between two message frames before or after the corresponding message frame during the channel idle time without interfering with data bus 2. FIG. 2 also shows that each of the two FlexRay nodes 12, 13 of programmable gateway 14 of device 10 has a communication controller (CC) 19 and a bus driver (BD) 18 for each channel ChA, ChB. Furthermore, as FIG. 2 shows in particular, each switch 16, 17 includes two analog multiplexers (2×2:1). In the exemplary embodiment of FIGS. 1 and 2, switch 16 is used for preventing a termination network 21 from burdening the remaining FlexRay network 1 in the case where no manipulation of the messages takes place, i.e., the original messages are looped directly through device 10. Termination network 21 is a function of the network topology in which manipulation device 10 is connected in between. Therefore, it is recommended that termination 21 is switched on or off, for example, via software, independently of the switchover of multiplexers 16, 17. In addition, termination network 21 must be "biased" in such a way that physical data bus 2 is minimally interfered with. For this purpose, additional wiring of main FlexRay cluster 2, 3 may be needed.

Multiplexers 16, 17 must be activated or deactivated exactly when the particular bus driver (BD) 18 is activated or deactivated for the corresponding time slot for transmitting the manipulated message. The corresponding control signal for multiplexers 16, 17 is normally available in the hardware; if not, it must be generated with the aid of (hardware) logic. However, as long as FlexRay communication controller (CC) 19 and FlexRay bus driver 18 are installed in separate modules, this control signal may usually be picked up directly between controller 19 and driver 18. In the depicted exemplary embodiment, signal TxEn is picked up as a control signal for multiplexers 16, 17, which is transmitted by communication controller 19 of transmitting node 13 of device 10 to the corresponding bus driver 18 for the two channels ChA, ChB. Control signal TxEn is conducted via a line 20 to the corresponding switching inputs SW of switches 16, 17.

If communication system 1 or the corresponding communication protocol provides bus monitoring, a so-called bus guardian BG, in nodes 12, 13 (and also in nodes 3, 4), the control signal for switching over switching elements 16, 17 must be generated in such a way that the transmission of the manipulated messages or the original messages (messages are looped through device 10) does not conflict with the bus guardian.

The above-described principle of selective switchover (activation/deactivation of device 10) for manipulation purposes may be extended by using a plurality of multiplexers/switches 16, 17 or so-called crosspoint switches, making manipulations of messages or of the contents of the messages in both directions possible. A more comprehensive, flexible, and realistic test operation of system 1 may thus be performed.

Any computer program that supports the interfaces of communication system 1, in the described exemplary embodiment the FlexRay interfaces 12, 13, and is programmable in a corresponding manner may be used as software in programmable gateway 14. It may be, on the one hand, in-house generated proprietary software. It may, however, also be standard software freely available on the market, such as, for example, CANalyzer or CANoe by Vector Informatik GmbH, Ingersheimer Straße 24, 70499 Stuttgart or similar software from other suppliers such as DeComSys. Particularly preferred is the use of software capable of using Fibex files as input. The Field Bus Exchange format (Fibex) offers a standardized description of a network. In particular, a Fibex file contains information about the network topology, as well as about the behavior over time during information transmission in the network. The Fibex file includes, in particular, information about which node communicates with what other nodes in which time slot, the cycle duration, setup information for the communication controller, physical units of the transmitted data, etc. The Fibex file also includes information about which of the nodes transmits sync frames when. The Fibex file is usually presented in the XML (Extensible Markup Language) format and may therefore be easily processed and edited. XML is a metalanguage and a quasi-standard for generating structured documents in the World Wide Web or in intranets.

The Fibex file does not need to be modified for implementing the present invention. In the exemplary embodiment illustrated in FIGS. 1 and 2, the Fibex file is, however, modified in such a way that the one FlexRay node 12 of device 10 (monitoring function) only reads and the other FlexRay node 13 of device 10 transmits the manipulated message frames or the manipulated message or the manipulated data contained therein in the time slot in which the original message frame to be manipulated would have been transmitted. By switching over multiplexers 16, 17, which may be easily switched over without further logic at the same time when bus driver 18 is enabled, the manipulated message, instead of the original message, will then be transmitted to node 4 to be tested. Alternatively, it is also possible, without manipulating the Fibex file, to initialize the two FlexRay nodes 12, 13 of device 10 on the basis of the information from the Fibex file, enabling them to perform their specific functions. This means that node 12 is initialized in such a way that it only reads and buffers the complete messages of the message frames that are important for the manipulation (original message frames). The software routines then access these saved messages, i.e., the data contents contained therein, preferably the payload data content, manipulate these data, and recompose them to form the messages, the manipulated messages.

These manipulated FlexRay messages are supplied to node 13, which then sends the manipulated frames or messages, instead of the original message frames or original messages, to node 4 to be tested. FlexRay node 13 must be initialized in such a way that it becomes active only as a transmitter when the time slots of the original message frames are in the queue to be manipulated. Node 13 is therefore always in the queue for transmitting, when the original transmitter nodes 3 of the message frames relevant for the manipulation are also in the queue for transmitting these frames. The information which node 3 is at what point in the queue for transmitting may then be obtained from the Fibex file.

Since all participating network nodes 3, 4 are connected to each other, except in those time slots in which the manipulated messages are transmitted, the permanent synchronization of the network or of the local clocks of the individual components 3, 4 to the global time is not at risk. By being initialized, it is even possible that manipulation device 10 assumes or is able to assume the function of node 3 transmitting the original message, so that communication controller CC 19 of transmitting node 13 then transmits the message frame in the corresponding time slot as a sync frame. This is decided by the software alone, which has all relevant information due to the Fibex file.

Figure 3:
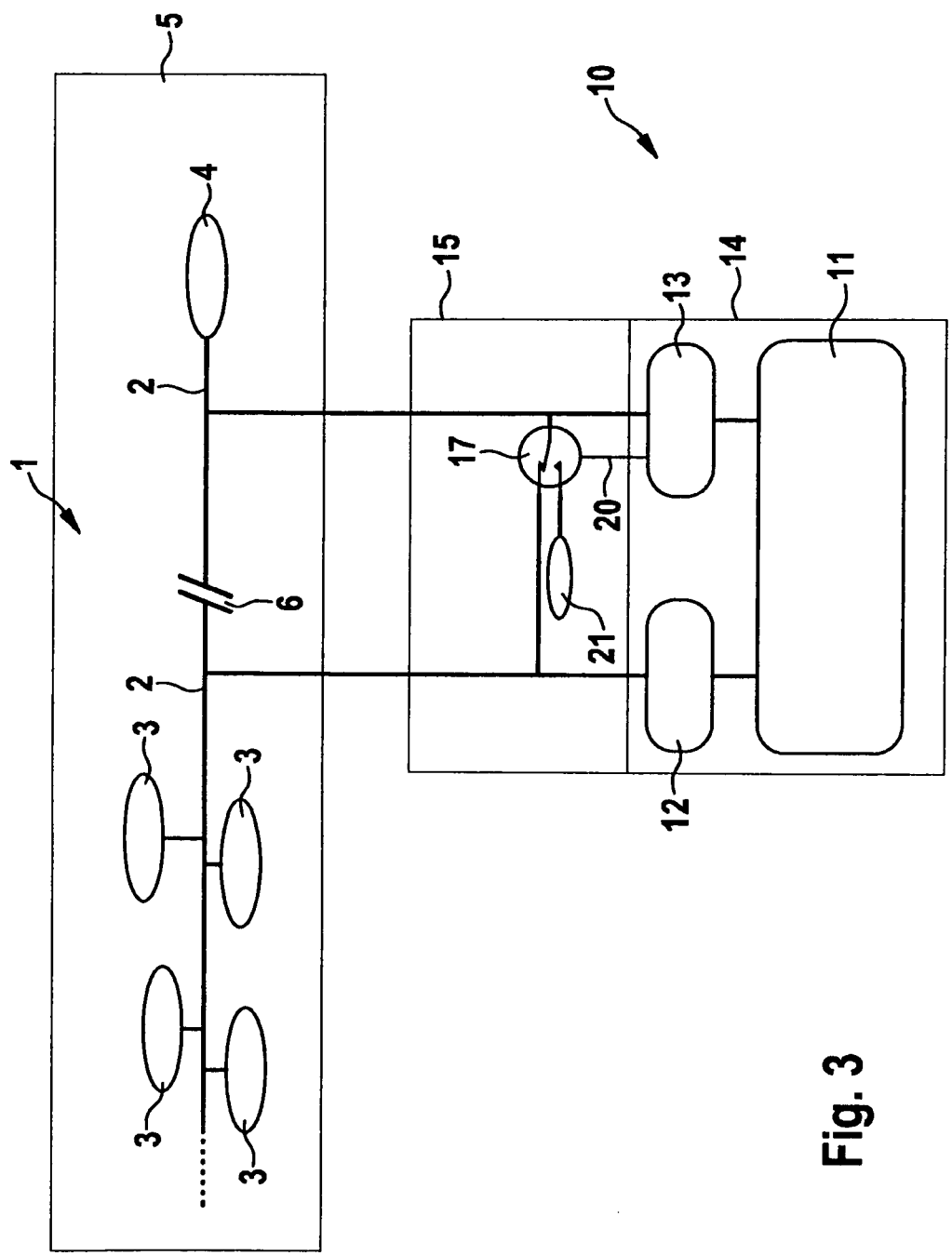
FIG. 3 shows a communication system according to the present invention having a device according to the present invention according to a second example embodiment.
Figure 4:
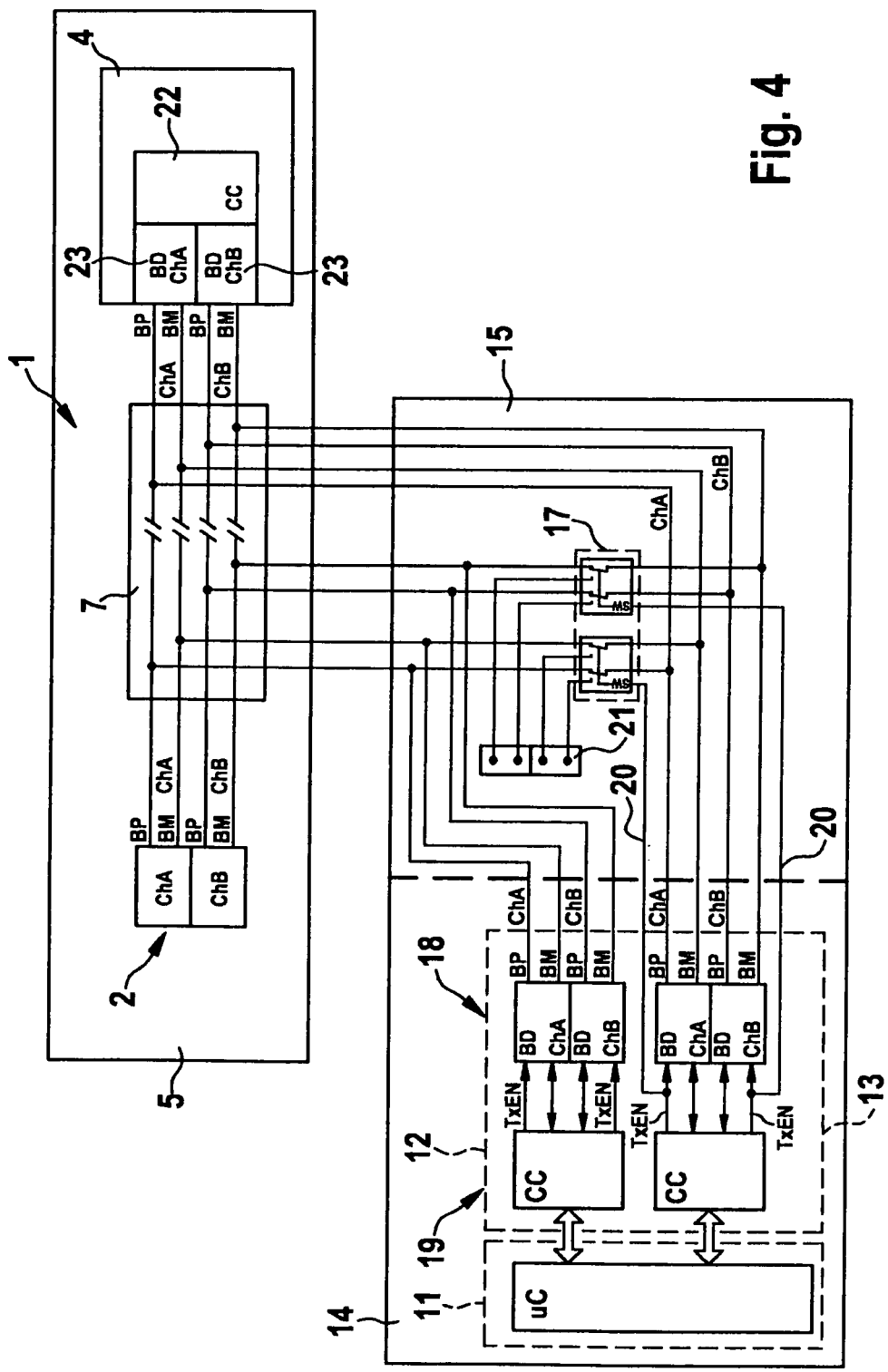
FIG. 4 shows a wiring diagram of the communication system of FIG. 3.

Another exemplary embodiment illustrated in FIGS. 3 and 4 differs from the first exemplary embodiment from FIGS. 1 and 2 in particular by the fact that only one multiplexer channel per FlexRay line is needed. Therefore, in FIG. 3 only one switch 17 is shown in manipulation device 10 according to the present invention; switch 16 has been omitted. Accordingly, the detailed circuit of FIG. 4 also shows only first switch 17, which includes two analog multiplexers, one for each channel ChA, ChB. The individual multiplexers of switch 17 are wired according to the circuit of FIG. 4. The signal for activating the multiplexers is identical to the TxEn (Transmit Enable) signal which is transmitted by communication controller 19 to bus driver 18 of transmitting node 13. Activation signal TxEN for the multiplexers of switch 17 is applied to switching input SW of the multiplexers via lines 20. The multiplexers of switch 17 are thus easily switched over without further logic at the same time when bus driver 18 is enabled, so that the manipulated messages, instead of the original messages, will then be transmitted to device 4 to be tested.

Figure 5:
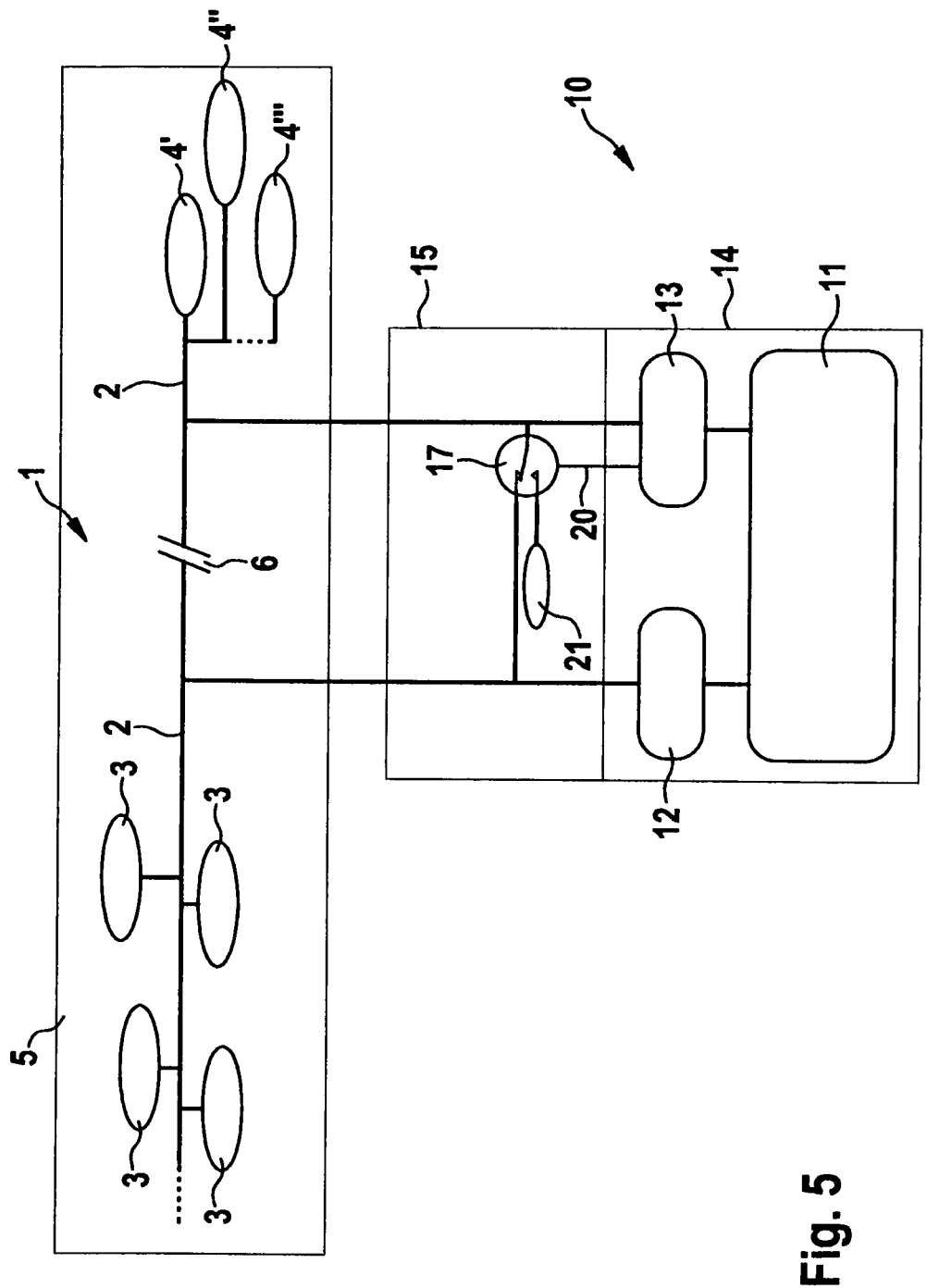
FIG. 5 shows a communication system according to the present invention having a device according to the present invention according to a third example embodiment.

FIG. 5 shows another exemplary embodiment of the present invention. The basic difference with respect to the exemplary embodiments of FIGS. 1 through 4 is that manipulation device 10 according to the present invention may be used not only for transmitting messages to be manipulated to a single node 4 to be tested, but also to a plurality of nodes 4', 4'', 4''' of a so-called subcluster. The information specifying which messages intended for nodes 4', 4'', 4''' should be intercepted and manipulated by device 10 must be present in manipulation device 10. Manipulated messages for node 4' are transmitted in the time slot of the corresponding communication cycle provided therefor by node 13 of device 10. Manipulated messages intended for the other nodes 4'' and 4''' to be tested are transmitted thereto in the corresponding time slots and communication cycles assigned to the original messages or to nodes 4'', 4''' to be tested. Out of the plurality of message frames or messages transmitted on data bus 2, device 10 according to the present invention may also pick, in a targeted manner, those messages which are intended for one of nodes 4', 4'', 4''' of the subcluster, manipulate the intercepted messages or their contents as specified and transmit the manipulated messages to the corresponding nodes 4', 4'', 4''' to be tested of the subcluster.

Figure 6:
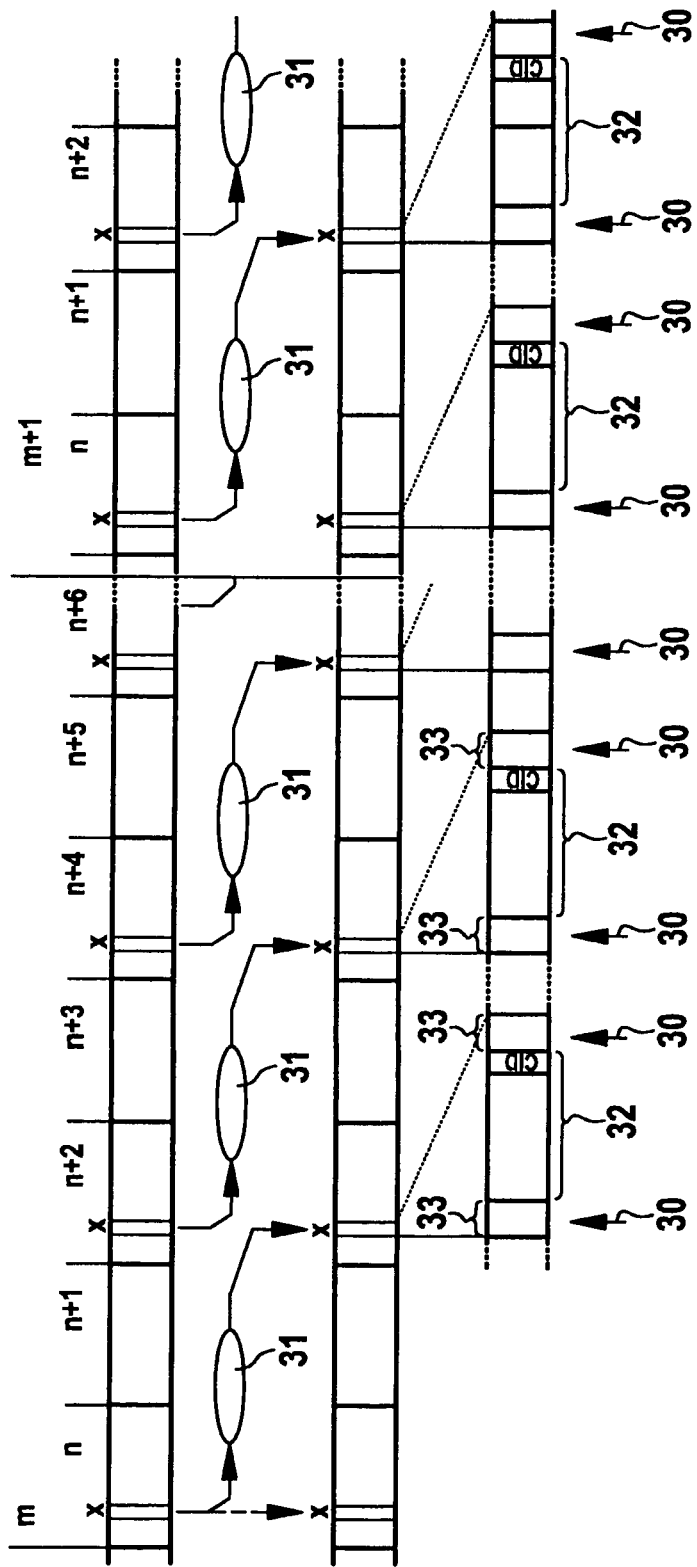
FIG. 6 shows an exemplary graph of the communication cycles in the communication systems according to FIG. 1, 3, or 5.

The sequence of the method according to the present invention is elucidated in greater detail below with reference to FIG. 6. FIG. 6 shows a plurality of successive repeat cycles m, m+1 in FlexRay communication system 1. Each repeat cycle m, m+1 is subdivided into a plurality of communication cycles n, n+1, . . . . A cycle counter is incremented by 1 in each cycle n, n+1, . . . . The cycle counter preferably runs from 0 to 63 to then restart at 0. Alternatively, the cycle counter may also be decremented from 63 to 0 to then restart at 63. Each repeat cycle corresponds to a run of the cycle counter from 0 to 63 or from 63 to 0. Of course, any other value > 0 may be chosen instead of the initial value or end value 63. Each cycle n, n+1, . . . is in turn subdivided into a plurality of time slots, of which one time slot x is shown in FIG. 6 as an example. Each time slot of a cycle is assigned to a certain node 3, 4 of communication system 1 and/or to a certain message. In the example illustrated in FIG. 6, a type of multiplexing is operated where time slot x is contained only in every second cycle n, n+2, n+4, . . . . In cycles n+1, n+3, n+5, . . . in between, the corresponding time slot may be used for transmitting another message or for transmitting messages from another node 3, 4.

The upper flow chart of FIG. 6 shows FlexRay messages of the original, unmanipulated network 1. The flow chart below it shows FlexRay messages as they arrive at node(s) 4 to be tested. Underneath the second flow chart, an enlargement of time slots x is illustrated. A rough subdivision of time slots x includes initially a channel idle time 33, followed by the actual FlexRay message frame 32 and a bit channel idle delimiter (CID), followed by another channel idle time 33. FlexRay message frame 32 is subdivided into header, payload, and trailer. The information of a message to be manipulated includes the information saved in FlexRay message frame 32, preferably payload data. In FIG. 6, arrows 30 indicate the points in time during channel idle times 33 at which communication controller 19 of device 10 switches the analog multiplexers of switches 16, 17 simultaneously with the activation/deactivation of bus driver 18, i.e., activates or deactivates the manipulation of the messages.

At the beginning of the communication, all nodes 3, 4 of communication system 1 are connected to each other (no isolating point 6). The initialization of communication system 1 and synchronization of all nodes 3, 4 therefore proceeds normally as in a conventional communication system 1. When the message to be manipulated is transmitted for the first time (cycle n in repeat cycle m), this message is relayed unchanged to device 4 to be tested, to which the original message is applied, i.e., in the first cycle n. This must be ensured by the software of manipulation device 10 or the software of programmable gateway 14. At the same time, the message relayed in the original is buffered in device 10, manipulated (function block 31), and written into communication controller 19 of transmitting node 13 of device 10 for next cycle n+2, when this time slot x is up again. Therefore this means that in cycle n+2 the original message transmitted in this cycle is intercepted by device 10. Instead of the intercepted original message from cycle n+2, the manipulated message from previous cycle n, when time slot x was last up, is transmitted to node(s) 4; 4', 4'', 4''' to be tested. When time slot x of the message to be manipulated is up with the message transmission as scheduled, communication controller 19 of transmitting node 13 of manipulation device 10 activates bus driver 18 for a transmission message. Simultaneously with this signal, the multiplexers of switch 17 and, if present, 16, are switched over and thus in this time slot x the manipulated message is applied to FlexRay data bus 2 for node 4 to be tested or subcluster 4', 4'', 4'''.

As soon as manipulation 31 is deactivated, the software of programmable gateway 14 must suppress the transmission of the message frame for time slot x to be manipulated. Multiplexers 16, 17 are thereby switched over, and the original data frame or the original message is relayed to test node 4 or subcluster 4', 4'', 4'''.

Of course, the structure of the messages must be known to the manipulation software of programmable gateway 14 of manipulation device 10 according to the present invention, so that the values of the original message to be manipulated may be manipulated as desired and then the manipulated message may be generated. In addition, the message numbers must be incremented, for example, by device 10, if present, and the required checksums must be recalculated. This information must also be saved in the manipulated message if necessary. It is important that manipulation device 10 intercepts messages intended for nodes 4; 4', 4'', 4''' to be tested in a manner invisible to those nodes, manipulates them as predefined, and recomposes them again to form a manipulated message, which corresponds to the protocol specification used in communication system 1. The use of manipulation device 10 according to the present invention must be virtually invisible to the entire communication system 1; in any case, device 10 must not simply delete information in the messages required for proper communication and/or generate erroneous messages that might result in an error of communication system 1. Nodes 4 to be tested receive the messages intended for them quite normally as they did previously, but having manipulated contents and, depending on the repeat rate of time slot x, delayed by one or more cycles n, n+1, . . . . The delay, however, is generally irrelevant for node 4 to be tested, as long as the repeat rate of time slot x is sufficiently high compared to the signal change rate of interest of the manipulated signal.

What is claimed is:

1. A device for manipulating communication messages in a communication system including a data bus, a plurality of nodes connected to the data bus, wherein the communication system is configured for transmitting messages in message frames at fixedly predefined communication cycles, comprising:

an intercepting unit configured to intercept a message intended for at least one node of the communication system before the message reaches the at least one node;

a manipulating unit configured to manipulate the intercepted message; and a transmitting unit configured to transmit the manipulated message to the at least one node;

wherein the device is situated on the data bus between the at least one node for which the manipulated message is intended and at least one other node of the communication system, wherein the device is configured to be selectively activated and deactivated, and wherein, in the deactivated state, the device does not manipulate the intercepted message intended for the at least one node, and wherein idle times are provided between message frames, during which idle times no communication messages are transmitted, and wherein the device includes at least one switching arrangement for at least one of selectively activating and deactivating during the idle times the arrangement configured to manipulate the intercepted message.

2. The device as recited in claim 1, wherein the device has access to information regarding the structure and behavior over time of the communication system, and wherein the arrangement configured to manipulate the intercepted message is at least one of selectively activated and deactivated as a function of the information regarding the communication system.

3. The device as recited in claim 2, wherein the information regarding the communication system is present in the form of a Fibex file.

4. The device as recited in claim 2, wherein the device includes a first network node and a second network node, the first network node being a read-only node reading the message intended for the at least one node and relaying the message to the arrangement configured to manipulate the message, and the second node being a write-only node transmitting the manipulated message to the at least one node.

5. The device as recited in claim 4, wherein the write-only node transmits the manipulated message in a subsequent communication cycle in a message frame corresponding to the message frame of the received message.

6. The device as recited in claim 5, wherein the write-only node transmits the manipulated message in a subsequent communication cycle in which the message frame of the received message is transmitted next.

7. The device as recited in claim 4, further comprising:

an arrangement configured to buffer the manipulated messages prior to transmitting the manipulated message to the at least one node.

8. The device as recited in claim 4, wherein the manipulation of the message includes a change in at least one of status values, checksums, offset values, offset ramps, sensitivities, and scalings in the message.

9. A communication system, comprising:

a data bus;

a plurality of network nodes connected to the data bus;

a transmitting unit configured to transmit communication messages among the nodes via the data bus, the communication messages being transmitted in message frames at fixedly predefined communication cycles;

a device located on the data bus and configured to isolate at least one node from the other nodes of the communication system, the device including:

an intercepting unit configured to intercept a message intended for at least one node of the communication system before the message reaches the at least one node;

a manipulating unit configured to manipulate the intercepted message;

a transmitting unit configured to transmit the manipulated message to the at least one node;

wherein the device is configured to be selectively activated and deactivated, and wherein, in the deactivated state, the device does not manipulate the intercepted message intended for the at least one node, and wherein idle times are provided between message frames, during which idle times no communication messages are transmitted, and wherein the device includes at least one switching arrangement for at least one of selectively activating and deactivating during the idle times the arrangement configured to manipulate the intercepted message.

10. The communication system as recited in claim 9, wherein the communication system is configured as a FlexRay communication system.

11. A method for manipulating communication messages in a communication system including a data bus, a plurality of nodes connected to the data bus, and an arrangement for transmitting messages in message frames at fixedly predefined communication cycles, the method comprising:

intercepting, by a manipulation device, a message intended for at least one node of the communication system before the message reaches the at least one node;

manipulating, by the manipulation device, the intercepted message; and transmitting, by the manipulation device, the manipulated message to the at least one node;

wherein the manipulation device is situated on the data bus between the at least one node for which the manipulated message is intended and at least one other node of the communication system, wherein the manipulation device is configured to be selectively activated and deactivated, and wherein, in the deactivated state, the manipulation device does not manipulate the intercepted message intended for the at least one node, and wherein idle times are provided between message frames, during which idle times no communication messages are transmitted, and wherein the manipulation device includes at least one switching arrangement for at least one of selectively activating and deactivating during the idle times the arrangement configured to manipulate the intercepted message.

* * * * *

UNITED STATES PATENT AND TRADEMARK OFFICE
CERTIFICATE OF CORRECTION

PATENT NO.         : 8,606,983 B2
APPLICATION NO.  : 12/311817
DATED              : December 10, 2013
INVENTOR(S)       : Siegfried Hahn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1216 days.

Signed and Sealed this
Twenty-second Day of September, 2015

Michelle K. Lee
*Director of the United States Patent and Trademark Office*